US009860788B2

(12) United States Patent
Cui et al.

(10) Patent No.: US 9,860,788 B2
(45) Date of Patent: Jan. 2, 2018

(54) RECONFIGURING MOBILE SERVICES BASED ON SHARED CONTROL SIGNALING LOAD INFORMATION

(71) Applicants: AT&T Intellectual Property I, LP, Atlanta, GA (US); AT&T Mobility II LLC, Atlanta, GA (US)

(72) Inventors: Zhi Cui, Sugar Hill, GA (US); Arthur Brisebois, Cumming, GA (US); Hongyan Lei, Plano, TX (US)

(73) Assignees: AT&T INTELLECTUAL PROPERTY I, L.P., At, GA (US); AT&T MOBILITY II LLC, Atlanta, GA (US)

( * ) Notice: Subject to any disclaimer, the term of this patent is extended or adjusted under 35 U.S.C. 154(b) by 48 days.

(21) Appl. No.: 14/558,966

(22) Filed: Dec. 3, 2014

(65) Prior Publication Data
US 2016/0165484 A1    Jun. 9, 2016

(51) Int. Cl.
| | |
|---|---|
| H04W 28/08 | (2009.01) |
| H04W 28/02 | (2009.01) |
| H04W 36/22 | (2009.01) |
| H04L 12/26 | (2006.01) |

(52) U.S. Cl.
CPC ............ H04W 28/08 (2013.01); H04L 43/08 (2013.01); H04W 28/0231 (2013.01); H04W 28/0284 (2013.01); H04W 36/22 (2013.01)

(58) Field of Classification Search
CPC . H04W 28/08; H04W 36/22; H04W 28/0231; H04W 28/0284; H04L 43/08
See application file for complete search history.

(56) References Cited

U.S. PATENT DOCUMENTS

| | | |
|---|---|---|
| 8,548,476 B2 | 10/2013 | Lei et al. |
| 8,676,186 B2 | 3/2014 | Niu |
| 2012/0100860 A1 | 4/2012 | Lei et al. |
| 2012/0270553 A1 | 10/2012 | Ha |
| 2012/0282929 A1 | 11/2012 | Persson et al. |
| 2013/0163439 A1 | 6/2013 | Jia et al. |
| 2013/0225174 A1 | 8/2013 | Hunukumbure |
| 2013/0294403 A1 | 11/2013 | Srinivasan |
| 2014/0073322 A1 | 3/2014 | Henderson et al. |
| 2014/0128086 A1 | 5/2014 | Gunnarsson et al. |
| 2014/0162661 A1 | 6/2014 | Shaw et al. |
| 2014/0204794 A1 | 7/2014 | El-Najjar et al. |

(Continued)

*Primary Examiner* — Walter Divito
(74) *Attorney, Agent, or Firm* — Guntin & Gust, PLC; Douglas Schnabel

(57) ABSTRACT

Aspects of the subject disclosure may include, for example, determining a first indication of a signaling load of a first wireless access node. The first wireless access node also receives, from a second wireless access node, a second indication of a signaling load of the second wireless access node. The first and second indications of signaling loads are based on coordination of first and second network traffic of first and second groups of mobile devices in wireless communication, respectively, with the first and second wireless access nodes. One of the first or second network traffic is identified in response to one of the first indication, the second indication, or both. A redirection of the one of the first network traffic or the second network traffic is also initiated in response to one of the first indication, the second indication, or both. Other embodiments are disclosed.

20 Claims, 8 Drawing Sheets

(56) References Cited

U.S. PATENT DOCUMENTS

2014/0269565 A1 9/2014 Chou
2014/0302859 A1 10/2014 Nama et al.
2016/0050604 A1* 2/2016 Lee .................... H04W 76/046
370/331

* cited by examiner

100

200

500

600

US 9,860,788 B2

RECONFIGURING MOBILE SERVICES BASED ON SHARED CONTROL SIGNALING LOAD INFORMATION

FIELD OF THE DISCLOSURE

The subject disclosure relates to reconfiguring mobile services based on shared control signaling load information.

BACKGROUND

Wireless data traffic has been growing at a very fast pace and the trend is still continuing. This trend is driven in part by substantial increases in processing power and features of mobile devices as well as advancements in data rates and sophisticated signal processing. The mobile devices access network resources by way of wireless access nodes, which can include base stations of a radio access network, e.g., a mobile cellular network, wireless access points of a WiFi network, a personal area network, and the like. Wireless data exchanges between the mobile devices and the nodes generally occur over a limited number of channels that fall within authorized portions of the radio frequency spectrum. Generally, radio access networks implement wireless communication protocols to manage such wireless data exchanges.

The wireless communication protocols can be used to "attach" user equipment to the wireless access node, e.g., to establish communications with a mobile device that roams into a cell, to handover mobile devices between neighboring cells, and the like. Despite advances in processing speeds and power consumption, wireless networks remain limited to some degree based on the limited available Radio Frequency (RF) spectrum. To improve the end user experience, mobile service providers are actively looking for mechanisms to improve system capacity and end user experience.

BRIEF DESCRIPTION OF THE DRAWINGS

Reference will now be made to the accompanying drawings, which are not necessarily drawn to scale, and wherein.

DETAILED DESCRIPTION

Figure 1:
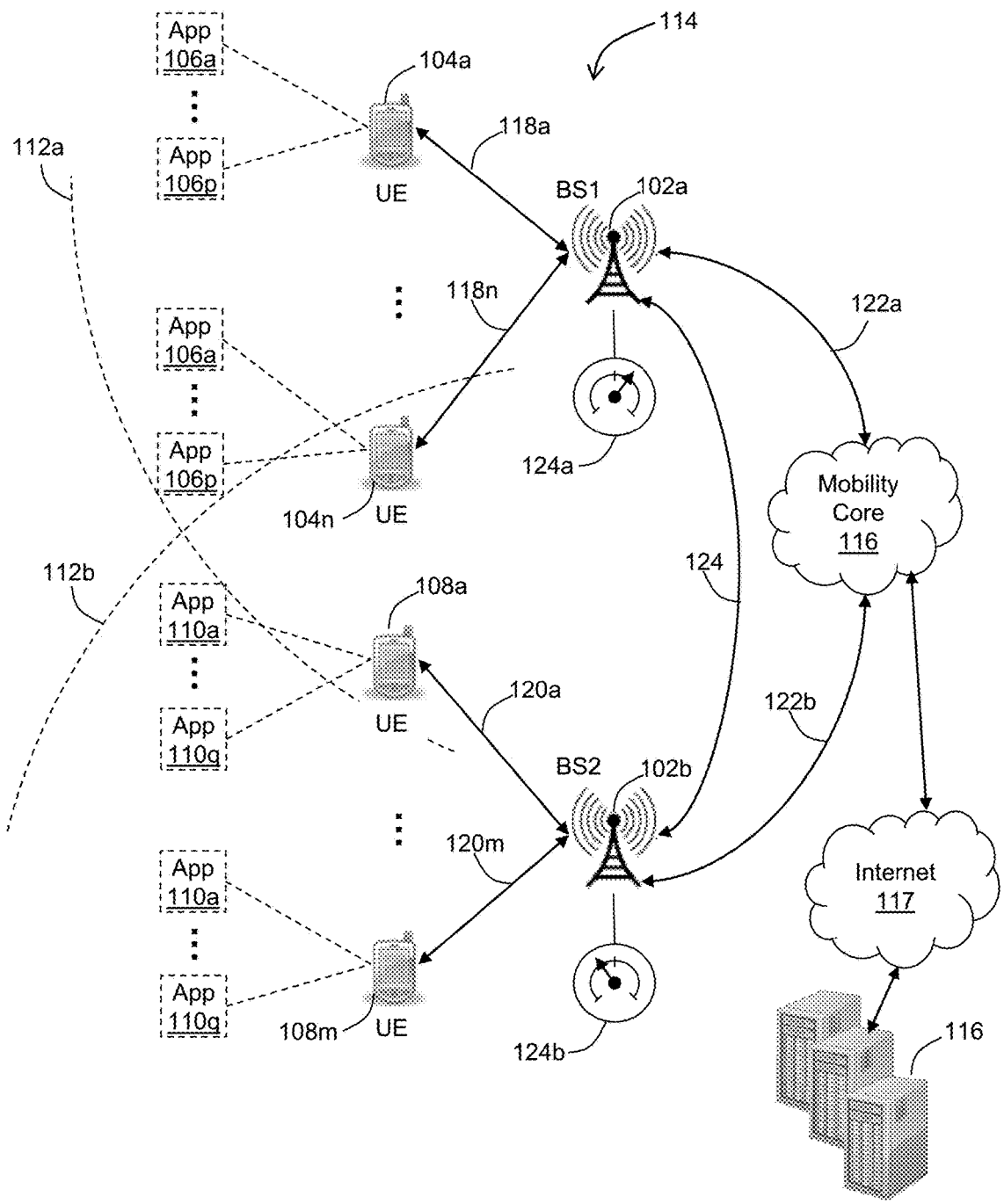
FIG. 1 depicts an illustrative embodiment of a mobile access network that shares indications of a control signaling load.

Traffic steering techniques are employed in mobility networks to improve throughput for larger numbers of mobile users. Beyond data traffic volume growth, there has been an even more aggressive growth in data control and/or signaling load. Control and/or signaling traffic generally refers to messages related to non-user data traffic for the control and/or coordination of user data traffic. Examples include control/signaling messages to establish a data bearer, manage tunneling and so on. In some applications, such signaling traffic can be handled by another channel. For many radio access networks, however, the signaling traffic is handled in-band, meaning that control or signaling data is passed on the same connection as main or user data.

Currently, wireless traffic steering techniques do not take into account network signaling conditions, such as the volume of signaling traffic or a corresponding load resulting from such signaling traffic. References to a control and/or signaling load generally refer to utilization of network resources involved the processing and exchange of the control/signaling traffic. This could lead to undesired network utilization across various radio access technologies, resulting in a poor user experience. It is conceivable that at some volume, the handling of control/signaling traffic will be to the detriment of user data traffic. This is particularly true for applications that rely on in-band signaling.

A volume of control/signaling traffic can depend on various factors, including a nature of the underlying application, interference, and so on. For example, some applications are referred to as being "chatty" in that they result in relatively large number of short messages, putting a strain on control signaling resources. Among various signaling messages and/or procedures on mobile cellular networks, e.g., UMTS and LTE, Radio Access Network (RAN) signaling procedures generally represent a substantial area of growth and resulting impact to a signaling load. This is due, at least in part, to complicated radio resource sharing techniques generally required to conserve limited resources, e.g., wireless radio frequency spectrum, occupied by various users and services.

The subject disclosure describes, among other things, illustrative embodiments for sharing signaling load information between wireless access nodes, or base stations. Other embodiments are described in the subject disclosure.

One or more aspects of the subject disclosure include wireless base transceiver stations configured to determine signaling loads. The base transceiver stations can determine their own signaling load and communicate with at least other neighboring base transceiver stations to exchange such signaling load information. Accordingly, a base transceiver station is generally aware of its own signaling load as well as the signaling load of its neighbors. The base transceiver stations can implement traffic steering algorithms based on the signaling load information to improve overall resource utilization.

One embodiment of the subject disclosure includes determining, by a first wireless access node having a processor, a first indication of a first signaling load of the first wireless access node. The first indication of the first signaling load is based on coordination of first network traffic of a first group of mobile devices in wireless communication with the first wireless access node. The first wireless access node receives a second indication of a second signaling load of the second wireless access node from a second wireless access node. The second indication of the second signaling load is based on coordination of second network traffic that relates to a second group of mobile devices in wireless communication with the second wireless access node. Responsive to one of the first indication, the second indication, or both, one of the first network traffic or the second network traffic is identified by the first wireless access node. Also responsive to one of the first indication, the second indication, or both, a redirection is initiated for of the one of the first network traffic or the second network traffic. The redirection is based on the identifying of the one of the first network traffic or the second network traffic.

Another embodiment of the subject disclosure includes a device having a memory that stores executable instructions and a processor coupled to the memory. The processor, responsive to executing the instructions, facilitates performance of operations including determining, at a first wireless access node, a first indication of a first signaling load of a first wireless access node. The first indication is based on coordination of first network traffic of a first group of mobile devices in wireless communication with the first wireless access node. A second indication of a second signaling load of the second wireless access node is received at the first wireless access node, from a second wireless access node. The second indication is based on coordination of second network traffic of a second group of mobile devices in wireless communication with the second wireless access node. One of the first network traffic or the second network traffic is identified and one of the first network traffic or the second network traffic is reconfigured based on the identification.

Yet another embodiment of the subject disclosure includes a machine-readable storage medium, including executable instructions which, responsive to being executed by a processor, cause the processor to facilitate performance of operations including receiving, at a wireless access node, an indication from a neighboring wireless access node of a signaling load at the neighboring wireless access node. The wireless access node processes first network traffic of a first group of mobile devices in wireless communication with the wireless access node. The indication of the signaling load is based on coordination of second network traffic of a second group of mobile devices in wireless communication with the neighboring wireless access node. One of the first network traffic or the second network traffic is identified, and and one of the first network traffic or the second network traffic is reconfigured based on the identifying of the one of the first network traffic or the second network traffic.

FIG. 1 depicts an illustrative embodiment of a portion of a wireless mobility network 100. The network 100 includes a first wireless access node 102a, sometimes referred to as a radio access node or a base transceiver station. The first wireless access node 102a is in wireless communication with a first group of mobile devices 104a . . . 104n (generally 104), sometimes referred to as user equipment (UE). Each mobile device 104 generally includes one or more applications or "apps" 106a . . . 106p (generally 106). Likewise, the network 100 includes a second wireless access node 102b in wireless communication with a second group of mobile devices 108a . . . 108m (generally 108), each including one or more apps 110a . . . 110q (generally 110). The apps 106, 110 can operate independently, but more often than not require some form of data exchange with a network accessible resource, such as a server.

In the illustrative embodiment, the network 100 includes a cellular mobile network in which each one of the wireless access nodes 102a, 102b services a respective cell. An indication of a portion of a first cell boundary 112a of the first wireless access node 102a is illustrated to encompass the first group of mobile devices 104 and in some configurations, at least a portion of the second group of mobile devices, e.g., mobile device 108a. Likewise, an indication of a portion of a second cell boundary 112b of the second wireless access node 102b is illustrated to encompass the second group of mobile devices 108 and in some configurations, at least a portion of the first group of mobile devices 104, e.g., mobile device 104n. In particular the wireless access nodes 102 are neighbors having cell coverage boundaries 112a, 112b (generally 112) that at least partially overlap.

The mobile devices 104, 108 can be relatively stationary or mobile depending upon the positions, trajectories and/or speeds of the mobile devices 104, 108. High mobility devices may be associated with users commuting on a train or in a car; whereas, more stationary device may be associated with users at a particular location, such as a business, home, or college campus. Wireless cellular systems are generally configured to allow mobile devices 104, 108 located within cell coverage boundaries 112 to attach to the mobility network through a respective wireless access node 102. Attachment generally requires some overhead communications or messages exchanged between the mobile device 104, 108 and the wireless access node 102. Once attached, the mobile devices can be in an active or idle state. Transition between different states also requires an exchange of control/signaling messages.

In at least some embodiments, the mobility network 100 includes a radio access network (RAN) 114 and a mobility core network 116. The radio access network 114 includes the wireless access nodes 102 and a first group of wireless communication links 118a . . . 118n (generally 118) between the first wireless access node 102a and the first group of mobile devices 104. Likewise, the radio access network 114 includes a second group of wireless links 120a . . . 120m (generally 120) between the second wireless access node 102b and the second group of mobile devices 108. The wireless links 118, 120 are supported on one or more wireless frequencies or channels. More than one mobile device 104, 108 can be serviced by the same wireless channel. Each of the wireless access nodes 102 is in communication with the mobility core 116 by a respective network connection 122a, 122b. The network connections can operate according to one or more communication protocols, such as standardized protocols, e.g., an S1 protocol of an LTE network.

The mobility core 116 can include one or more devices for handling message traffic, billing, load balancing, interference mitigation, and other operation support systems. In at least some embodiments, the mobility core 116 includes one or more gateway processors for exchanging messages with other networks, such as a packet data network, e.g., the Internet 117, satellite networks, IPTV networks, IP Multimedia Subsystem (IMS), private networks, such as intranets, and so on. In the illustrative embodiment, an application 106a of a mobile device 104a can exchange data with a remote server 116 by way of the mobility core 116 and the Internet 117.

The mobility network 100 also includes a network connection 124 between the neighboring wireless access nodes 102. In some configurations, wireless access nodes are configured in according to a mesh. When more than two wireless access nodes 102 are present, each node 102 can be in communication with at least all of its neighboring nodes. The network connection 124 between the wireless access nodes 102 can operate according to one or more communication protocols, such as a standardized X2 protocol of the LTE network.

The X2 protocol refers to a 3GPP standards-based interface, e.g., as specified in ETSI Technical Specification TS36.423, "LTE; Evolved Universal Terrestrial Radio Access Network (E-UTRAN); X2 Application Protocol (X2AP)" incorporated herein by reference in its entirety. The X2 interface is used for communication and information exchange between base stations 102, for one or more of load management, mobility management, inter-cell interference coordination, etc. The X2 interface allows an eNB 102 to determine a condition of a neighboring eNB's 102. Conditions can include load information, uplink/downlink interference overload and resource blocks.

Overhead messages, sometimes referred to as control or signaling messages, can be used to establish message exchange sessions between wireless access nodes 102. Overhead messages generally identify the capabilities, features and/or configurations of the mobile device 104, 108, e.g., according to an equipment identification number. The signaling messages can also identify a mobile subscriber account, such as a mobile telephone number, user name, email address, MAC address, or other suitable identifier. The mobile service identification can identify one of a service provider, an individual user, or both. This can be accomplished directly by content of the signaling message and/or by way of a lookup in which a database or similar data store is referenced by the mobile service identification.

At least some of the applications 106, 110 require access to network resources, such as the Internet 117 and/or one or more servers 116. Example applications 106, 110 include, without limitation, Web browsers, streaming media players, VoIP, video conferencing. In a Web browser application, the wireless access node 102 receives data packets from a mobile device 104 containing queries. The queries are forwarded to a mobility core network 116 for further processing.

Once a mobile device 104, 108 has attached to a mobile network, the device 104, 108 continues to transfer signaling messages periodically in a standby mode, allowing a mobile network service provider to track the mobile device 104, 108, for example, to maintain an allocation of resources and to direct incoming calls. In some instances, the mobile device 104, 108 becomes active, for example, when an application 106, 110 is active, or in response to receiving an incoming message or call.

Also shown are load indicators 124a, 124b in communication with respective wireless access nodes 102. The load indicators 124 reflect an indication of a control and/or signaling load at the wireless access node 102. The control/signaling load condition reflected by the load indicators 124 can be a real time value, e.g., updated in real-time or near-real-time as control/signaling load conditions change. Alternatively or in addition, the control/signaling load condition can be retrospective in that it provides an indication of a prior control/signaling load. In some embodiments, the load indicators 124 provide a predictive indication of future control/signaling load conditions. Such predictive indications can be near term, as in a few minutes, seconds or less, or relatively long term, as in hours of a day, or days of a week. To the extent a particular wireless access node 102 experiences repeatable ebbs and flows of its control signaling load, a record of prior usage can be used in a predictive manner for future indications of busy periods, e.g., a busy hour, or quiet times.

In some embodiments, the control/signaling load information reflected by the load indicators can be shared with neighboring nodes 102, e.g., by a control/signaling load indicator message. Such messages can be sent periodically, e.g., according to a regular cycle, and/or responsive to events. Such events can include a change in a status of the control/signaling load. Such changes in status can include the control/signaling load meeting or exceeding a predetermined threshold value. Thus, the load indicator 124 can identify that a control/signaling load has exceeded a threshold value.

Control/signaling load values reflected by the load indicators 124 can include an indication that the control/signaling load is one of "low," "medium," or "high," or some other suitable granularity, e.g., low or high. Alternatively or in addition, control/signaling load values reflected by the load indicators 124 can include a ranking value, such as a letter rank, or numeric value. Such values may be absolute and/or relative to some other condition. For example, a control/signaling load indication can be fashioned in relation to one or more of network activity, RF channel bandwidth, network bandwidth, processing load, e.g., CPU cycles, available memory or storage, message latency, a ratio compared to user data traffic, or available traffic capacity and so on.

Figure 2:
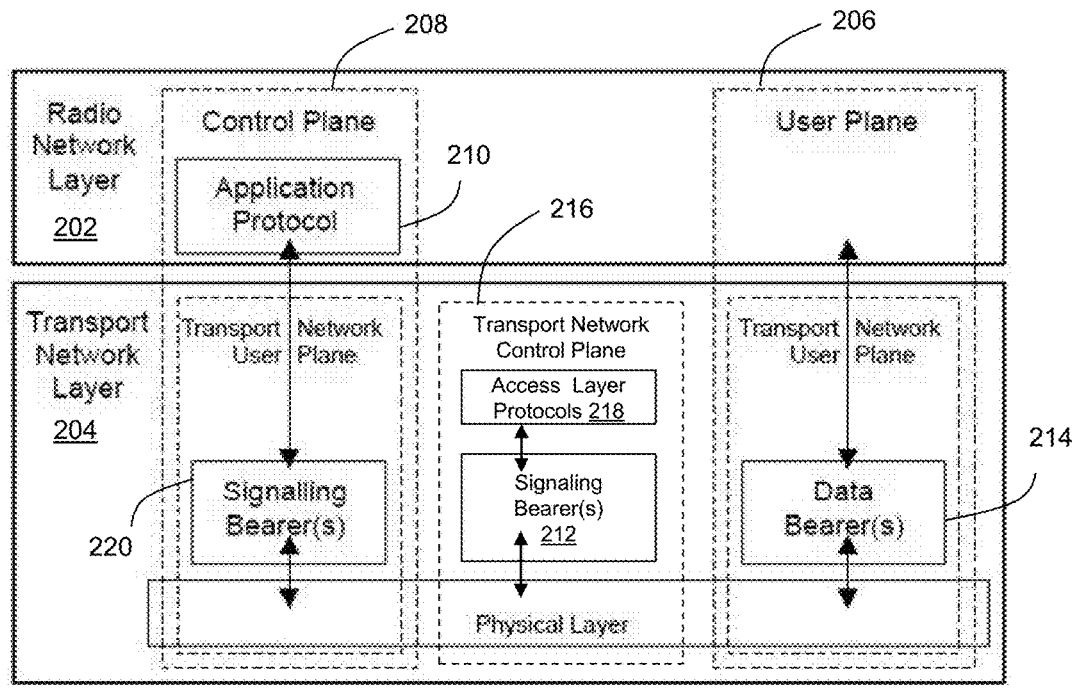
FIG. 2 depicts an example of a protocol configuration of an interface between mobile access nodes.

Communication protocols for each of the mobility network 100 can include separate provisions, for example, implementing separate protocol stacks, for signaling and for data. Referring next to FIG. 2, a schematic diagram of an example of a communication protocol structure 200 is shown. The protocol structure 200 includes at least two layers, a radio network layer 202 and a transport network layer 204. Radio access network related issues are visible to the radio network layer 202; whereas, the transport network layer 204 represents standard transport technology without any special radio access network specific requirements. The protocol structure 200 further includes resources dedicated to user data, sometimes referred to as a user plane 206 and resources dedicated to control/signaling data, sometimes referred to as a control plane 208. Each plane 206, 208 carries a different type of traffic and can include an overlay network, that is a telecommunications network that runs independently on top of another one, although supported by its infrastructure. The user plane 206, sometimes known as a data plane, a forwarding plane, a carrier plane, or a bearer plane, generally carries network user traffic. The control plane 208 carries overhead or signaling traffic. Control packets can originate from or are destined for a network device, such as a router. In some embodiments, the protocol 200 includes a management plane (not shown) that carries administrative traffic, e.g., billing. For the purposes of the illustrative example, the management plane can be considered a subset of the control plane 208.

In more detail, the control plane 208 includes an application protocol 210 and a signaling bearer 212 used for setting up bearers in the radio network layer 202. The user plane 206 includes data streams and data bearers 214 for data streams. Data streams are generally characterized by one or more frame protocols specified for a particular interface. The transport network control plane 216 does not include any radio network layer 202 information, residing in the transport layer 204. The transport network control plane 216 includes the access link protocol(s) 218 that is/are needed to set up the transport or data bearers 214 for the user plane 206. The transport network control plane 216 also includes the appropriate signaling bearer(s) 212 needed for the access link protocols 218.

The signaling bearers 212, 220 carry signaling message traffic; whereas, the data bearers 214 carry user data message traffic. Implementation of the protocol structure 200 will result in utilization of network resources. For example, messages of the data bearers 214 will result in a corresponding data load.

In conventional networking, all three planes can be implemented in the firmware of routers and switches, including the wireless access nodes, i.e., "intelligent" base stations or nodes. In software-defined networking (SDN) the data and control planes can be decoupled, removing the control plane from network hardware and implementing it in software instead. This enables programmatic access and tends to make the network administration much more flexible.

An "X2" interface refers to a standardized interface between wireless access terminals, otherwise known as eNodeBs within an LTE network. The X2 interface has a protocol stack adapted to perform user plane messaging, X2-UP and control plane messaging, X2-CP. In more detail, the X2-UP protocol supports a transfer of end-user packets between the LTE eNodeBs by way of a tunneling function. The tunneling function supports the identification of packets with the tunnels and packet loss management. A transport network layer is built on IP transport of LTE and GTP-U is used on top of the UDP or IP to carry user plane protocol data units (PDUs).

The LTE X2 control plane external interface (X2-CP) is defined between two-neighbor eNodeBs. The X2-CP protocol supports a load management function that allows exchange of overload and traffic load information between LTE eNodeBs to handle traffic load effectively. The handover function enables one eNodeB to handover the UE to another eNodeB. Legacy usage of this feature refers to user data traffic and not control and/or signaling packets. It is envisioned, however, that the X2-CP can support handover function as deemed appropriate for managing control/signaling loads as disclosed herein.

In general, a handover operation requires transfer of information necessary to maintain mobile network services, e.g., LTE RAN services, at the new eNodeB. It also requires the establishment and release of any tunnels that may exist between source and target eNodeB to allow data forwarding and informs the already prepared target eNodeB for handover cancellations.

LTE X2-CP protocol functions include one or more of intra LTE-Access-System mobility support for the UE; context transfer from source eNodeB to target eNodeB; control of user plane tunnels between source eNodeB and target eNodeB; handover cancellation; uplink load management; general X2 management; and error handling.

Figure 3:
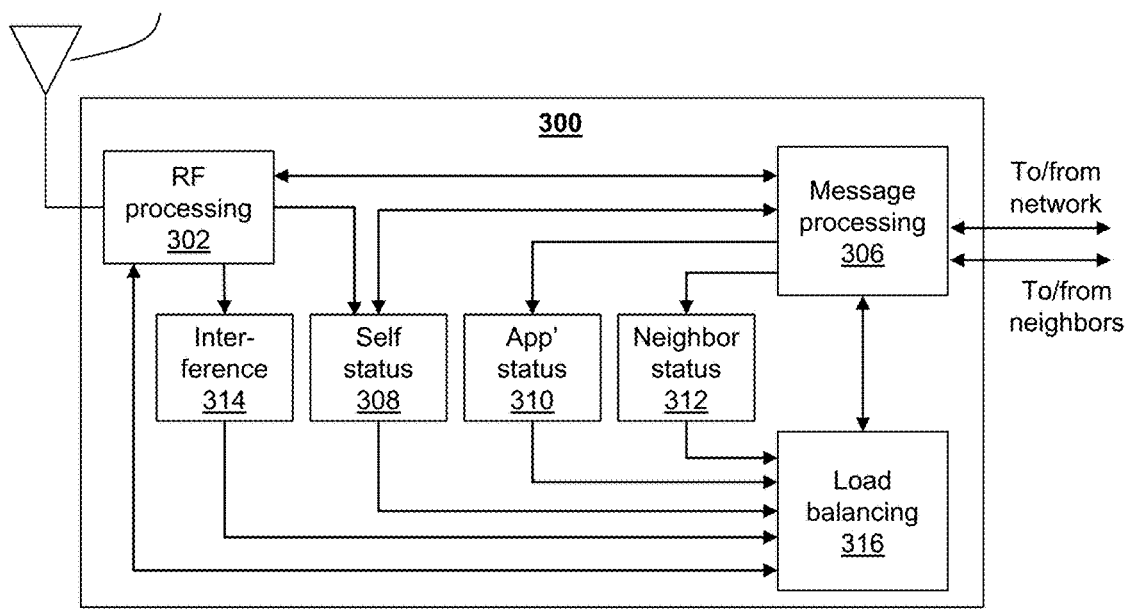
FIG. 3 depicts a functional block diagram of an example of a wireless access node of the system described in FIG. 1.

FIG. 3 depicts a functional block diagram of an example of a wireless access node 300 of the system described in FIG. 1. The wireless access node 300 includes a radio frequency (RF) processing module 302 in communication with an antenna module 304. The node 300 also includes a message processing module 306 in network communication with a core network 116 (FIG. 1) and one or more other neighboring wireless access nodes 102 (FIG. 1). The message processing module 306 can implement one or more protocol stacks for exchanging message or otherwise communicating with the core network and/or the neighbors 102. For example, the message processing module can implement aspects of the radio network layer 202 and transport network layer 204 of the example protocol structure 200 (FIG. 2).

In more detail, the node 300 includes one or more of a self-status module 308, an application status module 310, a neighbor status module 312 and an interference tracking module 314. Each of the self-status module 308, the application status module 310 and the neighbor status module 312 is in communication with the message processing module 306. The interference tracking module 314 can be in communication with one or more of the RF processing module 302 and the message processing module 306. In at least some embodiments, the self-status module 308 is also in communication with the RF processing module 302.

In at least some embodiments, the node 300 also includes a load balancing module 316. The load balancing module 316 is in communication with one or more of the message processing module 306, the self-status module 308, the application status module 310, the neighbor-status module 312 and the interference module 314. The load balancing module 316 can implement a load balancing algorithm based on inputs from one or more of the other modules 306, 308, 310, 312, 314 alone or in combination with information received from other network accessible resources. Operation of the node 300 and the load balancing module 316 are described more fully below.

It is also worth noting that one or more of the modules, such as the self-status module 308, the applicant status module 310 can provide the control/signaling load value indicated by the load indicator 124 (FIG. 1). In some embodiments, the load balancing module 316, or other suitable processing module, such as a central processing module (not shown) of the wireless access node 300 can prepare or otherwise determine the control/signaling load based on inputs from one or more of the modules 302, 306, 308, 310, 312, 314, 316.

Figure 4A:
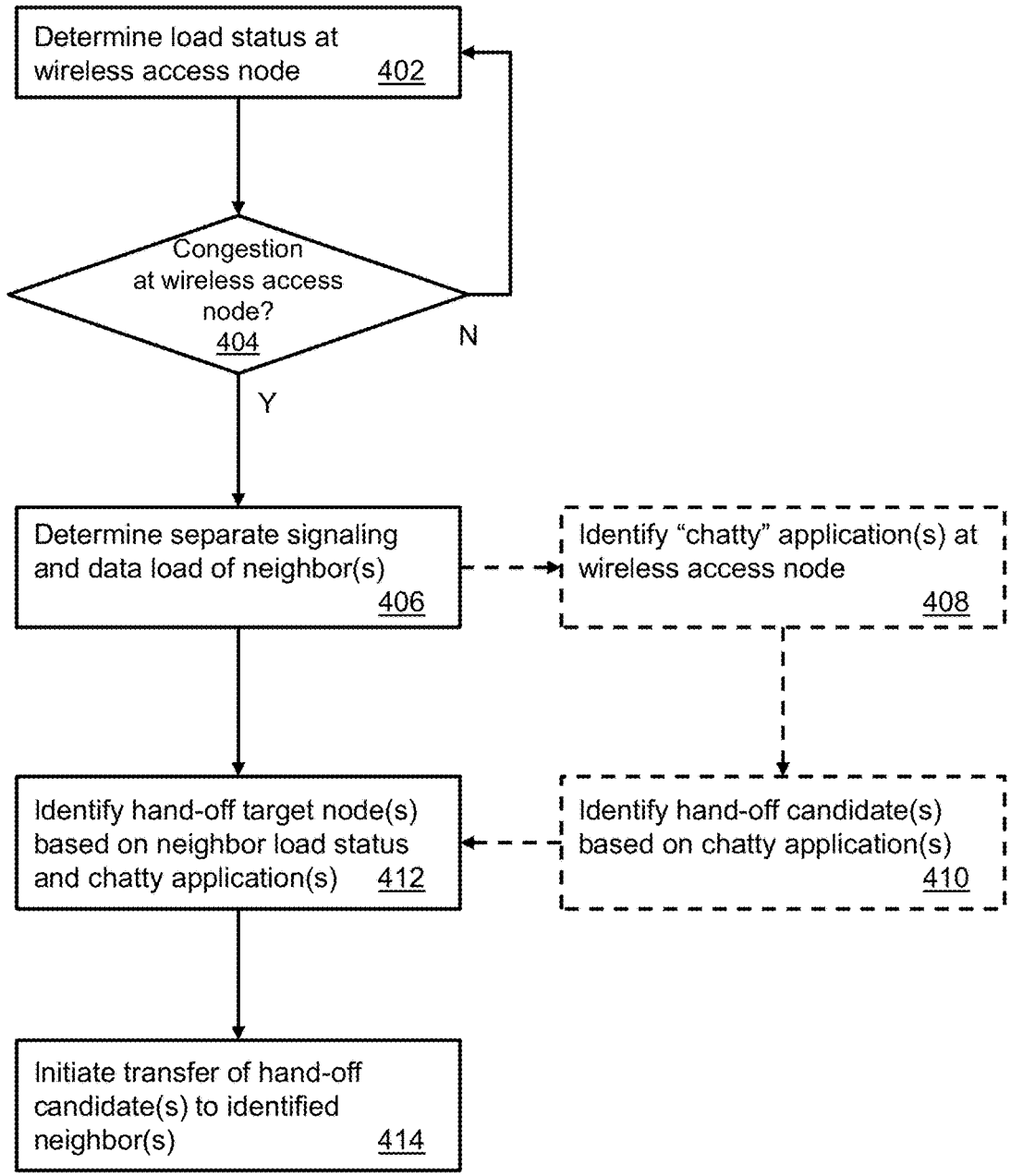
FIGS. 4A-4B depict illustrative embodiments of processes used in portions of the system described in FIG. 1.

FIG. 4A depicts an illustrative embodiment of process used in portions of the system described in FIG. 1. A control/signaling load is determined for a wireless access node at 402. This can include a self-determination of the control/signaling load by the wireless access node 102, 300 (FIGS. 1 and 3). For example, a wireless access node 300 can monitor one or more of message traffic of one or more of the transport network, the radio access network, and RF wireless channel usage. The control/signaling load can be measured in various units of measure including the examples disclosed herein. This can include a cumulative message count and/or a number of messages occurring within a predetermined time window, e.g., 1 sec., 10 sec., 1 min., 5 min or longer. Message counts can be used independently and/or combined with corresponding message duration and or bandwidth. Message durations and/or bandwidths can be actual values for a given message, average values, or some other suitable estimate.

The wireless access node can also predict the signaling load based on the types of applications and numbers of mobile devices being served. A measure of control/signaling load can be determined, e.g., calculated, according to a utilization percentage of one or more control-specific resources. For example in the LTE case a physical downlink control channel (PDCCH) and a physical uplink control channel (PUCCH) have a specific number of frequency and time resources reserved. One or more of an instantaneous and an average control/signaling loads can be calculated by comparing the in-use frequency and time resources to the total reserved frequency and time resources for PDCCH and PUCCH, e.g., over a predetermined interval.

The control/signaling load can be determined independently, or in combination with other values, such as an indication of a data load. When used in combination, the control/signaling load can be determined independently and in combination with other values, such as the data load, or in combination with such other values. By way of example, a combined value can include a load considering both the control/signaling load and the data load. A control/signaling load can be determined according to the combined load in view of the data load. The individual load factors can be combined in any suitable manner, such as by addition, including application of weighting factors.

A determination is made at 404 as to whether congestion exists at the wireless access node 300 (FIG. 3). Congestion can include network traffic congestion. Such indications of congestion can include one or more of a measure of a number of applications being serviced by the node, a number of mobile devices attached to the node, a number of messages being processed by the node, a bandwidth utilization of a wireless channel assigned to the node, network bandwidth of one or more of the transport network and the radio access network. Alternatively or in addition, a measure of congestion can include one or more of a measure of message latency, message retransmission, a measure of error correction being applied, and so on. In at least some embodiments, it is possible for an operator, system maintainer and/or system monitor to declare or otherwise assert congestion exists.

It should be understood that for any of the scenarios and techniques disclosed herein, a system implementing an exchange of signaling load information among wireless access nodes can self-detect overload/congestion and prevent/resolve congestion automatically without manual intervention. Alternatively or in addition, manual intervention can be applied alone or in combination with such automated detections/resolutions. Consider network status information, including signaling load information and/or information indicative of signaling load, being shared or otherwise presented at an operation and maintenance console. A human operator may take action that overrides or otherwise augments system automation.

In some embodiments, control/signaling congestion can be based on a combination of metrics, such as a complex reactive calculation of average queue size and length, e.g., a determination of how many queues and/or for how long users are awaiting control resources. Alternatively or in addition, control/signaling congestion can also be a simple predictive calculation based upon control resource utilization, e.g., based on some estimated congestion percentage for that resource utilization. For example, control/signaling congestion can be based upon a measure, e.g., Erlang B, of offered load or carried load.

To the extent that congestion exists or has otherwise been declared, determinations are made at 406 for one or more of signaling loads and data loads of neighboring wireless access nodes. To the extent that congestion does not exist, the process continues at 402, determining a load status at the wireless access node. The process 400 can be run continuously, periodically, and/or in response to an event. Load status of other nodes can be obtained directly from the neighboring nodes, e.g., by a self-reporting status by the nodes. The self-reporting can occur periodically, or in response to an event, such as a change in load status in either node. As with the load status of the wireless access node, the load status of the neighboring nodes can be reported according to various units alone or in combination with other values. That is, a control/signaling load value can be reported independently from a data load, or as a combined value. In some embodiments, the load status of neighboring nodes is received according to a broadcast, transmit or scheduling rule of each of the neighboring nodes. Alternatively or in addition, the load status is reported by the neighbor nodes in response to a query from another entity, such as the wireless access node itself.

In at least some embodiments, or more neighboring wireless access nodes are identified as handover targets at 412. If it has been determined at 404 that the wireless access node is experiencing congestion, a capacity or suitability for receiving a handover of a mobile device can be determined according to the load status of the neighbors determined at 406. For example, neighboring nodes having a reported or observed low load status can be identified as being suitable target nodes for a handover.

In some embodiments, contributors to one or more of the signaling load and data load are determined or otherwise estimated or identified at 408. This can include a characterization of particular applications, devices and/or users as contributing substantially or minimally to a node's load status. For example, some applications, such as streaming media, may result in a relatively low control/signaling load contribution, while contributing substantially to the data load. Data loading can also depend on the nature of the underlying data, such as audio versus video, versus large format and/or high-definition video. Other applications, such as remote desktop applications, can result in relatively high control/signaling load contribution, while contributing minimally to the data load. Other applications can fall anywhere in between.

It is understood that applications, mobile devices and/or individual users can be identified or otherwise distinguished, and load indicators identified and/or tracked individually. Such tracking results can be tabulated or otherwise stored for all of some portion of applications, mobile devices and/or individual users active at any given time. For example, only those applications, devices, users responsible for contributing to a load in some significant manner can be identified/tracked. This might include on the top application/device/user, the top several, and/or those contributing to the load above some threshold value.

When such applications and/or mobile devices or uses are identified or otherwise tracked, they can be further identified as candidate applications and/or mobile devices or users. Namely, they can be identified as handover candidates 410. For applications tracking the top data and/or control/signaling load contributors, the tracked leaders can be identified as handover candidates.

It is conceivable that particular applications can be handed off to neighboring wireless access nodes, while other applications continue to be handled by the same wireless access node. That is, a particular device running multiple applications might have one application, e.g., streaming media, handed off to a neighboring node to address load balancing, while another application, e.g., VoIP remains active on the original node. Thus, the mobile device would be attached to two mobile access nodes after occurrence of the handover event.

It is worth noting here that while the examples provided herein are generally directed to mobile cellular networks, they can be applied to other networks, including, small cell, e.g., microcell or femtocell, WiFi, personal area networks, and so on. It is also conceivable that the original wireless access node and the neighboring nodes considered and/or involved in a handover may need to subscribe to the same network, the same service provider, or even the same technology. Thus, congestion on a mobile cellular network might result in transfer of a device and/or an application of the device to another network, such as a small cell, or WiFi.

An identification of chatty applications at 408 and identification of handover candidates based on the chatty applications at 410 (both shown in phantom) can be performed as an option. The optional steps can include a system option implemented according to the type or configuration of an underlying system. Alternatively or in addition, the option can be exercised conditionally based on other factors, such as past and/or predicted load status. Thus, when a load status is low for the access node and neighboring nodes, there may be no need to perform the optional steps 408, 410. However, as the control/signaling and/or data loads increase, the optional steps 408, 410 can be implemented in anticipation of handover activity. A transfer of the handover candidate to the identified target node is ultimately initiated at 414.

In at least some embodiments, identification of the target nodes is based on one or more of signaling load status, data load status and one or more applications based on their contribution to the signaling and/or load status.

Figure 4B:
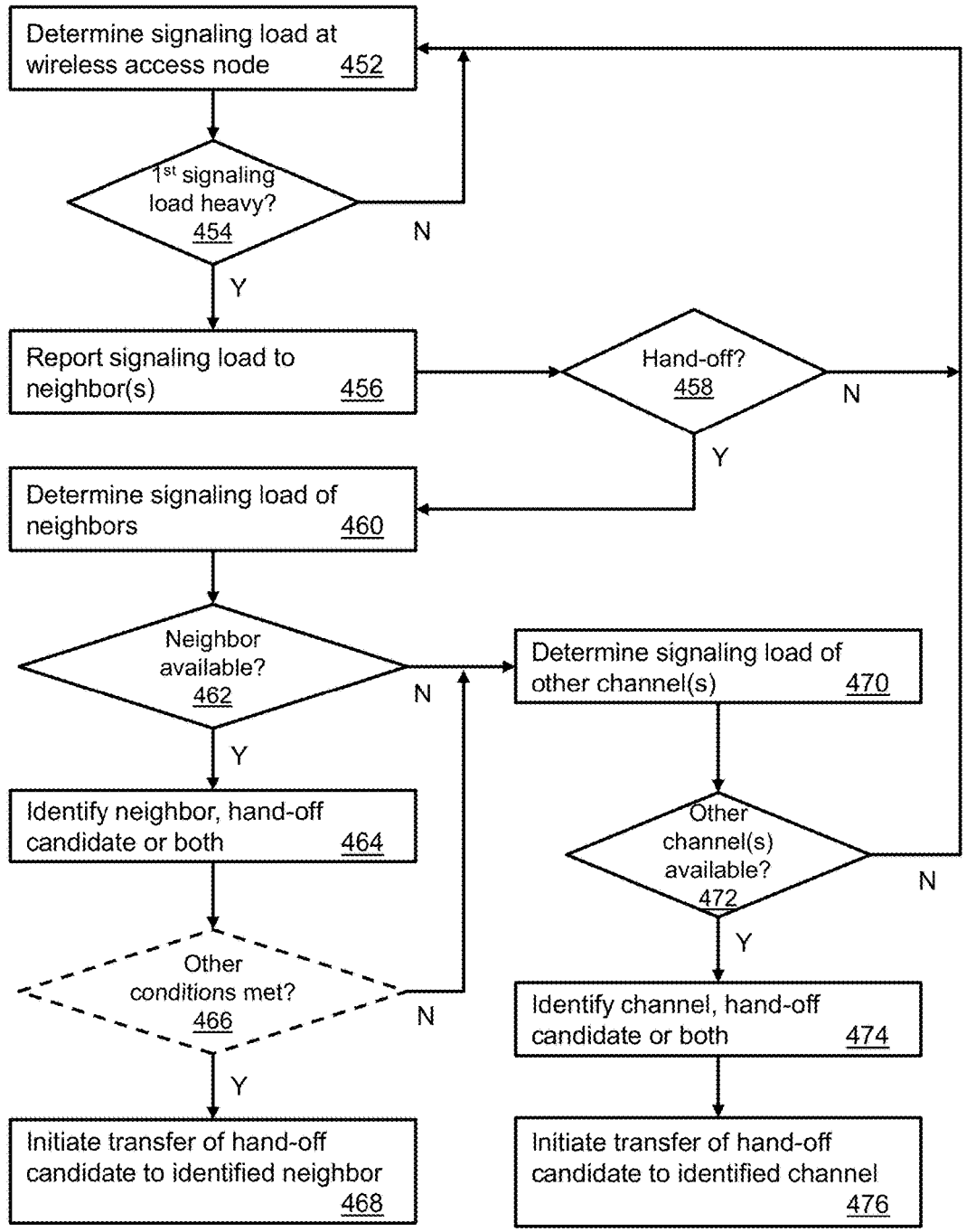

FIG. 4B depicts an illustrative embodiment of another process 450 used in portions of the system described in FIG. 1. A signaling load is determined at a wireless access node at 452. The signaling load can be determined according to any of the various techniques disclose herein. A determination is made at 454 as to whether the signaling load is heavy or otherwise excessive. A heavy signaling load can be determined according to an absolute scale, e.g., a number of messages, bandwidth, message frequency, and so on. Alternatively or in addition, a heavy signaling load can be determined according to an impact to performance, such as data throughput, packet throughput and the like. Whether a particular signaling load is heavy can depend on a predetermined threshold value, heavy usage being determined for signaling loads above the threshold value.

To the extent that the signaling load is determined to be heavy, an indication of the signaling load is reported to one or more neighboring wireless access nodes at 456. This might include a message sent from the originating wireless access node directly to neighboring nodes, and/or indirectly by way of another network route, including the transport network, an operation and maintenance network, or other suitable sideband channel, such as a wired, fiber or even telco connection. In the illustrative example, the messages are sent directly between neighboring nodes of an LTE network using the X2 interface. This can include messages sent to neighboring nodes of the same mobility network service provider and those of another mobility network service provider.

The signaling load information can be exchanged using various techniques. For example, the signaling load information can be exchanged in response to an event-trigger. By way of illustrative example and without limitation, event triggers can be based on one or more of a performance measure exceeding a threshold (e.g., a number of active mobile devices, a quantity of data traffic, a message latency, memory usage), an occurrence of a fault condition, a link condition, an error rate and/or a measure of error correction, a date, day, or time of day, and so on. Alternatively or in addition, the signaling load information can be exchanged according to a schedule, e.g., periodically and/or by demand. For example, demand driven exchanges can be initiated by one or more of a transferring node, a receiving node, another node, e.g., a coordinating node not directly involved in the exchange, another network element, such as any of the servers and/or gateways of the mobility network, e.g., the core network, and/or other equipment, such as a server of a third party service provider.

According to any of the techniques disclosed herein, the signaling load information can be exchanged at any load level. That is, signaling load information can be exchanged at one or more of low, medium, and/or high values—not only when congestion happens. For example, signaling load information can be exchanged to bring the mobility network to a predetermined state. Such predetermined states can include quiescent states when traffic and/or signaling load is relatively low, e.g., after periods of congestion and/or in anticipation of congestion or some other network state.

Although the examples refer to signaling load information be exchanged between two access nodes, such signaling load information can be exchanged in a one-to-many relation (one access node exchange signaling load info with multiple neighbors) and/or many-to-many relations. For example, one node experiencing congestion may exchange signaling load information with more than one neighboring nodes. The nodes can be managed by the same mobility service provider and/or by different mobility service providers.

The control/signaling load can be measured on one or more of the RF wireless channel, the LTE-Uu channel, the S1-U channel, the S1-MME channel, and/or other communication interfaces of the wireless access node. In the illustrative example, such messages. To the extent that signaling load not determined to be heavy at 454, the process once again determines a signaling load at the wireless access node at 542. The process 450 can be run continuously, periodically, and/or in response to an event.

A determination is made at 458 as to whether a handover should occur. Once again, handover can refer to a transfer of one or more of an application, a mobile device, or a particular user. To the extent that it is determined that a handover should occur, signaling load(s) of one or more neighboring wireless access nodes are determined at 460. In some embodiments, this can be accomplished by inspecting indicator(s) of neighboring nodes that are stored locally within the wireless access node, or otherwise accessible to the node. Such values can be maintained and updated in response to reports, e.g., change in load status reports, received from the corresponding neighbor nodes. To the extent that it is determined that a handover is unnecessary at 458, the process once again repeats from the beginning, e.g., determining a signaling load at the wireless access node at 542.

To the extent that one or more neighboring nodes are available, a particular neighbor is determined at 464. In at least some embodiments, one or more candidate wireless devices or users are also identified at 464 as candidates for the handover. It is conceivable that multiple candidate wireless devices are identified as candidates for a handover to a single neighboring node. It is also conceivable that multiple candidate wireless devices are identified as candidates for handovers to more than one neighboring nodes. In some embodiments, other conditions must be satisfied before a handover can be initiated. By way of non-limiting example, such conditions can include relative signal strength and/or quality of the neighboring node versus the current node: for each wireless device being considered for load based handover: one or more of a willingness of the neighboring node(s) to accept a handover, approval by a network administrator or administrative function as to the handover, and the like. If multiple wireless devices are being served, i.e., more than one candidate for load balance, the combination of wireless device use pattern (e.g., chatty or not) and/or relative signal strength (e.g., close enough to the neighboring node or not) can be used for selection. Such mechanisms can reduce the number of handovers for a desired load migration amount, while reducing a risk of poor performance after load balance handover. Presuming the other conditions, if any, are met, a transfer or handover of the one or more handover candidates to the one or more target neighbors is accomplished at 468.

To the extent the other conditions are not met at 466, or that no suitable neighbors are identified at 462, a signaling load of other wireless channels of the same wireless access node are evaluated at 470. To the extent that other channels are identified, a further determination is accomplished at 472 as to whether the other channels are available 472 to accept a handover. To the extent that other channels are available to accept a handover, a particular handover channel and a particular handover candidate are identified at 474.

A transfer or handover of the one or more handover candidates to the one or more other channel(s) is accomplished at 476. To the extent that other channels are not available at 472, a determination of signaling load at the wireless access node is accomplished at 452. The process 450 continues from there, running automatically, in an effective loop.

By way of illustrative example, each eNB 102 (FIG. 1) of an LTE network collects its own control signaling load utilization. If an eNB, say eNB1's 102a control/signaling load reaches a predetermined threshold, for instance, control/signaling load is "high" on a scale of "low, medium, high," the eNB1 102a sends a "control/signaling load" information element (IE) to its X2 neighbor, e.g., eNB2 102b, and perhaps other neighboring eNB(s) (not shown). The neighbor eNB(s) 102b that receives this updated IE can make better mobility and/or load balancing decision that take into consideration the control/signaling load information along with other information, such as data load, interference level, etc.

By way of further example, in a first use case a signaling load of eNB1 102a is "low," while a signaling load of eNB2 102b is "high." Node eNB2 102b can make a load-balancing decision to move one or more mobile devices, e.g., devices with chatty application users, to node eNB1 102a. As noted above, this can occur if other conditions are met. Other conditions might include whether the mobile device is within wireless range of the neighboring node. Referring to FIG. 1, UE 104n, which is initially attached to the first BS1 102a also falls within coverage range 112b of the second BS2 102b. Accordingly, the UE 104n would be a candidate for handover, whereas, UE 104a, which falls outside of a reliable coverage range of BS2 102b would not be a candidate for handover as it does not meet the other condition of falling within the overlapping region of coverage. In some embodiments, other conditions include multiple available wireless channels of the same wireless access node. This would allow for load balancing or handovers to different channels of the same wireless access node.

In another use case, node eNB1 102a is experiencing a signaling load that is "high," while node eNB2 102b is experiencing a signaling load that is "low." A load balancing algorithm 316 (FIG. 3) implemented at eNB2 102b might determine not to move devices with chatty applications to node eNB1 102a.

In yet another use case, node eNB1 102a reaches congestion and need to offload traffic to neighboring nodes eNB2 102b and eNB3 (not shown). Both nodes eNB2 and eNB3 are experiencing data loads that are characterized as medium. A first neighboring node eNB2 has a signaling load that is "high," while the second neighboring node eNB3 has a signaling load that is "low." A load balancing algorithm 316 implemented at eNB1 might determine to offload chatty applications to eNB3, while offloading non-chatty applications to eNB2. Ultimately, the resulting handover decisions can be implemented to result in greatest network utilization for a largest number of users.

Generally, chatty application traffic can be moved to other frequencies and/or radio access technologies, e.g., including cellular and Wi-Fi, if signaling is a bottleneck of the concerned eNB. Devices with chatty applications are generally not moved to eNBs with high signaling load. Such rules help to maximizing utilization of network resources and improving the end user experience.

It is understood that other parameters can be incorporated into any load balancing algorithm to offer different levels of service to different categories of applications, devices and/or users. Thus, under a congested scenario, certain applications, devices, users can take priority over others despite impacts of corresponding control/signaling and/or data loads.

Figure 5:
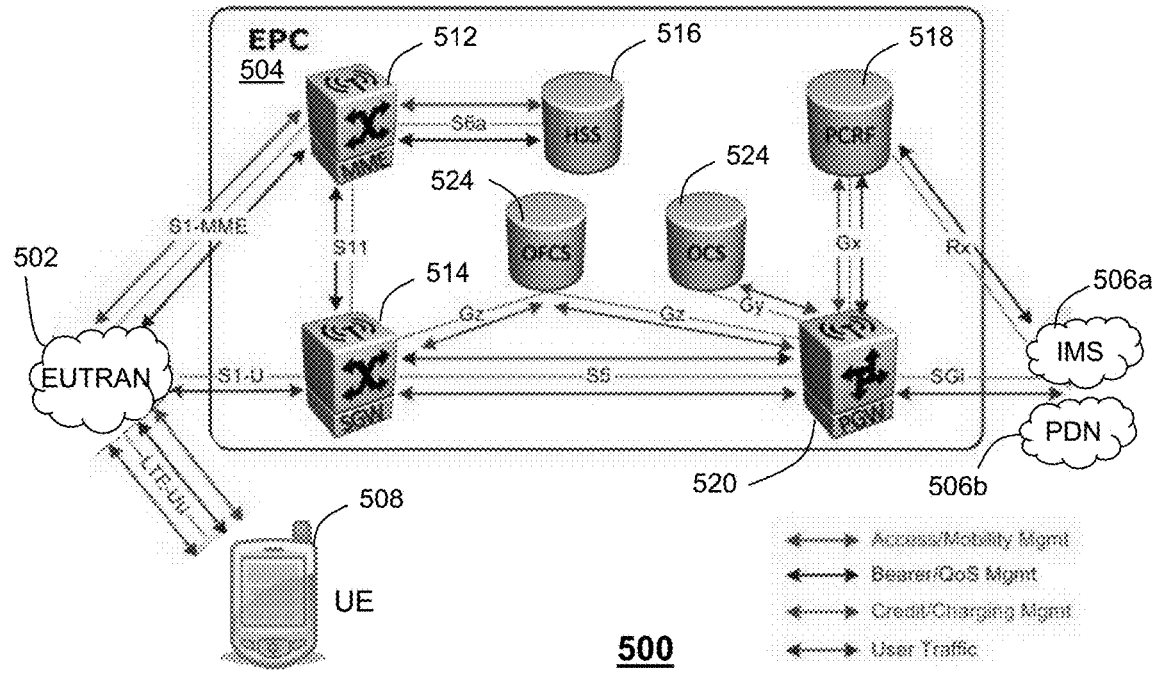
FIG. 5 depicts an illustrative embodiment of a Long-Term Evolution (LTE) network infrastructure.

The present disclosure broadly discloses a method, a non-transitory machine readable medium and an apparatus for performing signaling load balancing in a network architecture, such as the LTE, Evolved Packet System (EPS) network architecture. FIG. 5 illustrates a functional block diagram depicting one example of an LTE-EPS network architecture 500 related to the current disclosure. In particular, the network architecture 500 disclosed herein is referred to as a modified LTE-EPS architecture 500, e.g., including the traffic handling features disclosed herein, to distinguish it from a traditional LTE-EPS architecture.

An example modified LTE-EPS architecture 500 is based at least in part on standards developed by the 3rd Generation Partnership Project (3GPP), with information available at www.3gpp.org. In one embodiment, the LTE-EPS network architecture 500 includes an access network 502, a core network 504, e.g., an EPC or Common BackBone (CBB) and one or more external networks 506a, 506b (generally 506), sometimes referred to as packet data network (PDN) or peer entities. The external networks 506 can include one or more trusted and non-trusted external networks such as an internet protocol (IP) network 506a, an IP multimedia subsystem (IMS) network 506b, and other networks, such as a service network, a corporate network and the like.

The access network 502 can include an LTE network architecture sometimes referred to as Evolved Universal mobile Telecommunication system Terrestrial Radio Access (E UTRA) and evolved UMTS Terrestrial Radio Access Network (E-UTRAN). Broadly, the access network 502 can include one or more mobile communication devices, commonly referred to as UE 508, and one or more wireless access nodes, or base stations. During network operations, at least one base station communicates directly with the UE 508. The base station can be an evolved Node B (eNodeB), with which the UE 508 communicates over the air and wirelessly. The UEs 508 can include, without limitation, wireless devices, e.g., satellite communication systems, portable digital assistants (PDAs), laptop computers, tablet devices and other mobile devices (e.g., cellular telephones, smart appliances, and so on). Such UEs 508 can connect to the eNBs when the UE 508 is within range according to a corresponding wireless communication technology.

The UE 508 generally runs one or more applications that engage in a transfer of packets between the UE 508 and one or more of the external networks 506. Such packet transfers can include one of downlink packet transfers from the external network 506 to the UE 508, uplink packet transfers from the UE 508 to the external network 506 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within the core network 504, e.g., according to parameters, such as the QoS.

The core network 504 uses a concept of bearers, e.g., EPS bearers, to route packets, e.g., IP traffic, between a particular gateway in the core network 504 and the UE 508. A bearer refers generally to an IP packet flow with a defined QoS between the particular gateway and the UE 508. The access network 502, e.g., E UTRAN, and the core network 504 together set up and release bearers as required by the various applications. Managing bearers is one example of contributors to signaling load.

In one embodiment, the core network 504 includes various network entities, such as a Mobility Management Entity (MME) 512, a Serving Gateway (SGW) 514, a Home Subscriber Server (HSS) 516, a Policy and Charging Rules Function (PCRF) 518 and a PGW 520. In one embodiment, the MME 512 comprises a control node performing a control signaling between various equipment and devices in the access network 502 and the core network 504. The protocols running between the UE 508 and the core network 504 are generally known as Non-Access Stratum (NAS) protocols.

According to traditional implementations of LTE-EPS architectures, the SGW 514 routes and forwards all user data packets. The SGW 514 also acts as a mobility anchor for user plane operation during handovers between base stations, e.g., during a handover from a first eNB to a second eNB as may be the result of the UE 508 moving from one area of coverage, e.g., cell, to another. The SGW 514 can also terminate a downlink data path, e.g., from the external network 506 to the UE 508 in an idle state, and trigger a paging operation when downlink data arrives for the UE 508. The SGW 514 can also be configured to manage and store a context for the UE 508, e.g., including one or more of parameters of the IP bearer service and network internal routing information. In addition, the SGW 514 can perform administrative functions, e.g., in a visited network, such as collecting information for charging (e.g., the volume of data sent to or received from the user), and/or replicate user traffic, e.g., to support a lawful interception. The SGW 514 also serves as the mobility anchor for interworking with other 3GPP technologies such as universal mobile telecommunication system (UMTS).

At any given time, the UE 508 is generally in one of three different states: "detached", "idle" or "active." The detached state is typically a transitory state in which the UE 508 is powered on but is engaged in a process of searching and registering with the network 502. In the active state, the UE 508 is registered with the access network 502 and has established a wireless connection, e.g., radio resource control (RRC) connection, with the eNB 510. Whether the UE 508 is in an active state can depend on the state of a packet data session, and whether there is an active packet data session. In the idle state, the UE 508 is generally in a power conservation state in which the UE 508 typically does not communicate packets. When the UE 508 is idle, the SGW 514 can terminate a downlink data path, e.g., from one of the peer entities 506, and triggers paging of the UE 508 when data arrives for the UE 508. If the UE 508 responds to the page, the SGW 514 can forward the IP packet to the eNB.

The HSS 516 can manage subscription-related information for a user of the UE 508. For example, the HSS 516 can store information such as authorization of the user, security requirements for the user, quality of service (QoS) requirements for the user, etc. The HSS 516 can also hold information about the external networks 506 to which the user can connect, e.g., in the form of an APN of the external networks 506. For example, the MME 512 can communicate with the HSS 516 to determine if the UE 508 is authorized to establish a call, e.g., a voice over IP (VoIP) call before the call is established.

In some embodiments, the core network includes an Online Charging System (OCS) 522 and an Offline Charging System (OFCS) 524. The OCS 522 communicates the PGW 520 over a Gy interface to manage online charging for events. The OCS 522 can be used to charge customers using the mobile devices 508 for services delivered by the mobility network 500. Likewise, the OFCS 524 communicates with the SGW 514 and the PGW 520 over Gz interfaces. Charging information for network resource usage is collected, processed and transferred to a network operator's billing domain for subscriber billing and/or inter-operator accounting.

The PCRF 518 can perform QoS management functions and policy control. The PCRF 518 is responsible for policy control decision-making, as well as for controlling the flow-based charging functionalities in a policy control enforcement function (PCEF), which resides in the PGW 520. The PCRF 518 provides the QoS authorization, e.g., QoS class identifier and bit rates that decide how a certain data flow will be treated in the PCEF and ensures that this is in accordance with the user's subscription profile.

The PGW 520 can provide connectivity between the UE 508 and one or more of the external networks 506. In the illustrative network architecture 500, the PGW 520 can be responsible for IP address allocation for the UE 508, as well as one or more of QoS enforcement and flow-based charging, e.g., according to rules from the PCRF 518. The PGW 520 is also typically responsible for filtering downlink user IP packets into the different QoS-based bearers. In at least some embodiments, such filtering can be performed based on traffic flow templates. The PGW 520 can also perform QoS enforcement, e.g., for guaranteed bit rate bearers. The PGW 520 also serves as a mobility anchor for interworking with non-3GPP technologies such as CDMA2000.

Within the access network 502 and the core network 504 there may be various bearer paths/interfaces, e.g., represented by solid lines. Some of the bearer paths can be referred to by a specific label. For example, the solid line labeled S2-U can be considered an S1-U bearer and the solid line labeled S5 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 504 can include various signaling bearer paths/interfaces, e.g., control plane paths/interfaces represented by corresponding lines. Some of the signaling bearer paths may be referred to by a specific label. For example, a dashed line can be considered as an S1-MME signaling bearer, the dashed line can be considered as an S11 signaling bearer and the dashed line can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

The techniques disclosed herein provides mechanism that make eNB cell control signaling information available to its neighbor eNB cells, allowing them to make intelligent mobility and load balancing decisions by taking into account of real-time control signaling load conditions in addition to other network and UE conditions. Access to control/signaling load information of neighboring nodes allows for implementation of preventive solutions to enhance mobility and load balancing. It can optimize network resources for data bearer and signaling load, and improve performance of applications, such as VoIP.

It is understood that the control/signaling load information and exchange thereof between nodes disclosed herein, can also be used as factors to consider in centralized Self-Organizing Network (SON) solutions, e.g., if centralized load balancing/mobility optimizations are used.

A SON is an automation technology designed to make the planning, configuration, management, optimization and healing of mobile radio access networks simpler and faster. SON functionality and behavior has been defined and specified in generally accepted mobile industry recommendations produced by organizations such as 3rd Generation Partnership Project (3GPP) and the Next Generation Mobile Networks (NGMN).

LTE technology can make use of SON features, while they can also been retro-fitted into older radio access technologies such as Universal Mobile Telecommunications System (UMTS). The LTE specification inherently supports SON features, such as Automatic Neighbor Relation (ANR) detection.

In some embodiments, operational base stations regularly self-optimize parameters and algorithmic behavior in response to observed network performance and radio conditions. Self-organizing networks are commonly divided into three major architectural types: distributed SON, centralized SON and hybrid SON. In a distributed SON, functions are distributed among the network elements at the edge of the network, typically the wireless access nodes, e.g., eNB, elements. In centralized SON, functions tend to be concentrated closer to higher-order network nodes or the network OSS, to allow a broader overview of more wireless access nodes and coordination of a load across a relatively wide geographic area. Centralized SON would allow for a more centralized approach to load balancing and/or mobility. Generally, a hybrid SON is a combination of distributed and centralized approaches.

Self-organizing network functionalities are commonly divided into three major sub-functional groups: self-configuration functions; self-optimization functions; and self-healing functions. Self-configuration functions allow both connectivity establishment, and download of configuration parameters to be implemented in software. For example, when a new base station is introduced into a network and powered on, it is recognized and registered by the network. The neighboring base stations then automatically adjust their respective technical parameters to provide required coverage and capacity, while also avoiding interference. In general, each wireless access node contains a large number of configuration parameters that control various aspects of a cell site. Each of these configuration parameters can be altered to change network behavior, e.g., based on observations of both the wireless access node itself, and measurements at the wireless access node, user equipment or another system monitor.

Self-organizing Networks features are being introduced gradually with the arrival of new 4G systems in wireless mobility networks, Self-optimization mechanisms in wireless mobility networks can be seen to have some similarities to automated trading algorithms in financial markets. SON provides an Automatic Neighbor Relations (ANR) feature that automatically configures neighbor relations based on actual radio conditions.

Referring next to FIG. 5, an illustrative embodiment of a mobile handover within an LTE network is depicted in schematic representation. A mobile device 608 is initial attached to a first wireless access node 602a, communicating with other network resources over the LTE network 604. In particular, messages are routed to/from the mobile device 608 by way of a first MME 612a, a first SGW 614a, and a PGW 620. The PGW 620 provides gateway services to other networks, such as the Internet, allowing the mobile device 608 to engage in network exchanges with other network devices by way of the Internet.

According to the techniques disclosed herein, the first wireless access node 602a exchanges control/signaling load information with a first neighbor node 602b. Depending upon control/signaling load status, the first node 602a may choose to handover the mobile device 608 to the first neighboring node 602b. This transfer is suggested by the arrow between the mobile device 608 attached to the first node 602a, and the same mobile device 608' later attached to the first neighboring node 602b.

Depending upon details of the handover, the signals may continue to be routed through the same LTE network components, or different components. The illustrative example indicates an old SGW 614a and a new SGW 614b. It is understood that in some situations, the handover may result in a change in the SGW as indicated.

The same processes can be implanted by the first neighboring node 602b, for example, determining at some later time that a handover is required to a second neighboring node 602c. The handover might be caused by congestion at the first neighboring node 602b, by mobility of the mobile device to a new location within the cellular network, or by some other reason as may cause a mobile device to be transferred from one node to another. It is also understood that in at least some instances, a handover of the mobile device 608' might result in a change of other LTE system components, such as the MME 612b.

Figure 7:
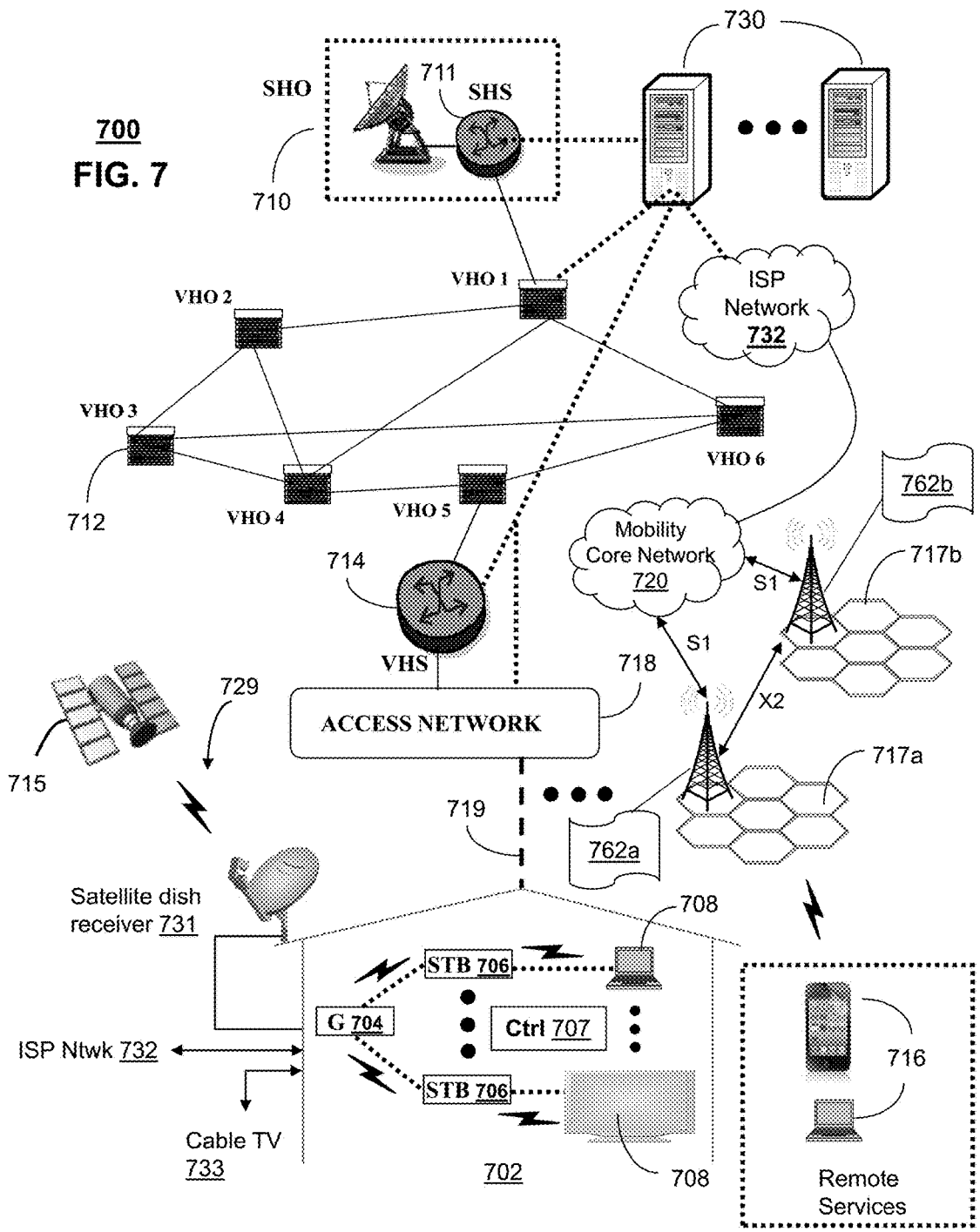
FIG. 7 depicts an illustrative embodiment of a communication system that provides media services by way of the mobile access network of FIGS. 1-5.

FIG. 7 depicts an illustrative embodiment of a first communication system 700 for delivering media content. The communication system 700 can represent an Internet Protocol Television (IPTV) media system. Communication system 700 can be overlaid or operably coupled with reference to system 100, 500, 600 of FIGS. 1, 5 and/or 6 as another representative embodiment of communication system 700. For instance, one or more devices illustrated in the communication system 700 of FIG. 7 determine control/signaling loads of wireless nodes and share such load information directly with neighboring nodes to allow the nodes to redirect network traffic for improved utilization of limited system resources.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as an application server (herein referred to as server 730). The wireless access base stations 717a, 717b (generally 717) can use computing and communication technology to perform function 762a and 762b (generally 762), respectively. The wireless access base stations 717, which can include among other things, the traffic steering, load-balancing techniques described by process 400 of FIG. 4A, and/or by process 450 of FIG. 4B. For instance, function 762 can be similar to the functions described for one or more modules of the wireless access node 300 of FIG. 3 in accordance with processes 400, 450.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In some embodiments, techniques disclose herein can be employed in an IP Multimedia Subsystem (IMS) network architecture to facilitate the combined services of circuit-switched and packet-switched systems. Such a communication system can be overlaid or operably coupled with system 100, 500, 600 of FIGS. 1, 5 and/or 6 and communication system 700 as another representative embodiment of communication system 700.

Figure 6:
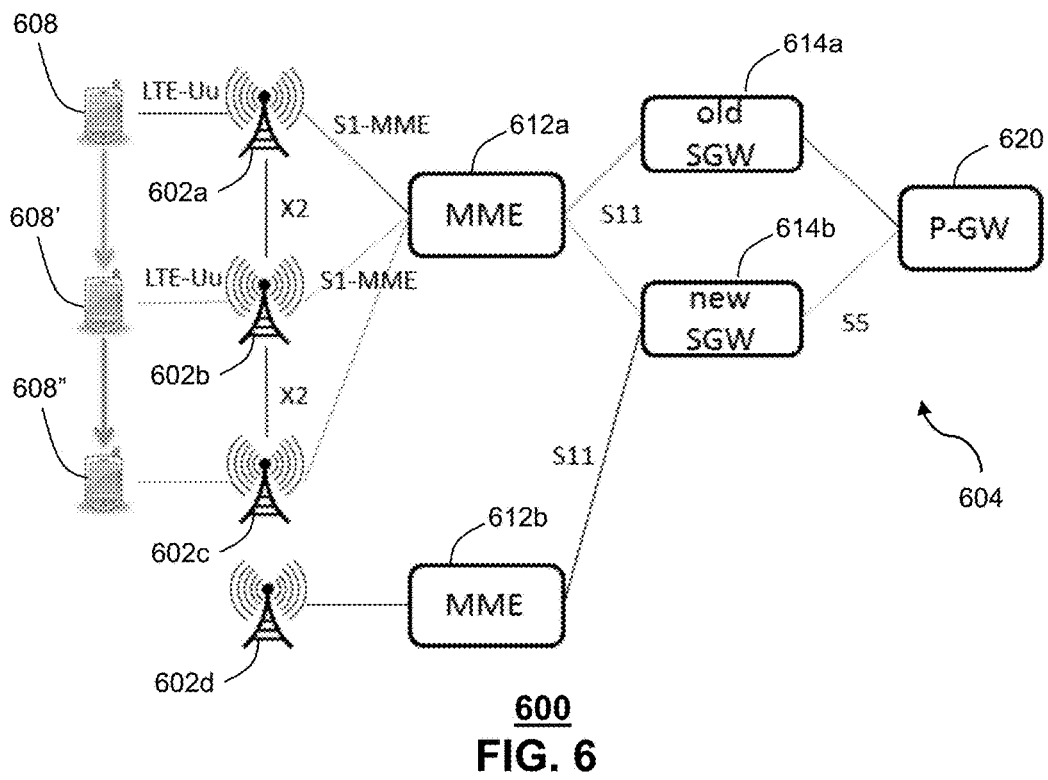
FIG. 6 depicts an illustrative embodiment of a mobile handover within an LTE network.
Figure 8:
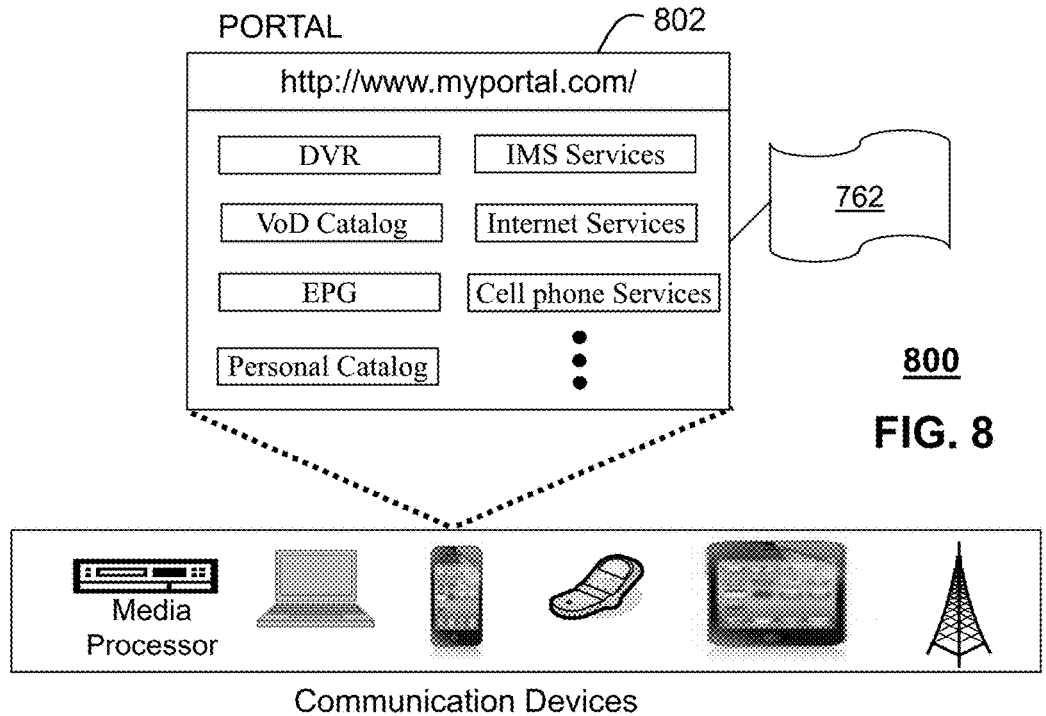
FIG. 8 depicts an illustrative embodiment of a web portal for interacting with the communication systems of FIGS. 1-7.

FIG. 8 depicts an illustrative embodiment of a web portal 802 of a communication system 800. Communication system 800 can be overlaid or operably coupled with system 100, 500, 600 of FIGS. 1, 5 and/or 6, communication system 700 as another representative embodiment of system 100, 500, 600, communication system 700. The web portal 802 can be used for managing services of system 100, 500, 600 of FIGS. 1, 5 and/or 6 and communication system 700. A web page of the web portal 802 can be accessed by a Uniform Resource Locator (URL) with an Internet browser using an Internet-capable communication device such as those described in FIGS. 1, 5, 6 and/or 7. The web portal 802 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 802 can also be used for provisioning IMS services described earlier, provisioning Internet services, provisioning cellular phone services, and so on.

The web portal 802 can further be utilized to manage and provision software applications 762, to adapt these applications as may be desired by subscribers and/or service providers of the systems 100, 500, 600 of FIGS. 1, 5 and/or 6, and communication systems 700. For instance, the wireless access nodes can obtain control/signaling load status of themselves and their neighbors to identify opportunities for reconfiguring traffic flow to better utilize limited resources, and so on. Service providers can log onto an administrator account to provision, monitor and/or maintain the systems, e.g., the wireless access nodes of systems 100, 500, 600 of FIGS. 1, 5 and/or 6.

Figure 9:
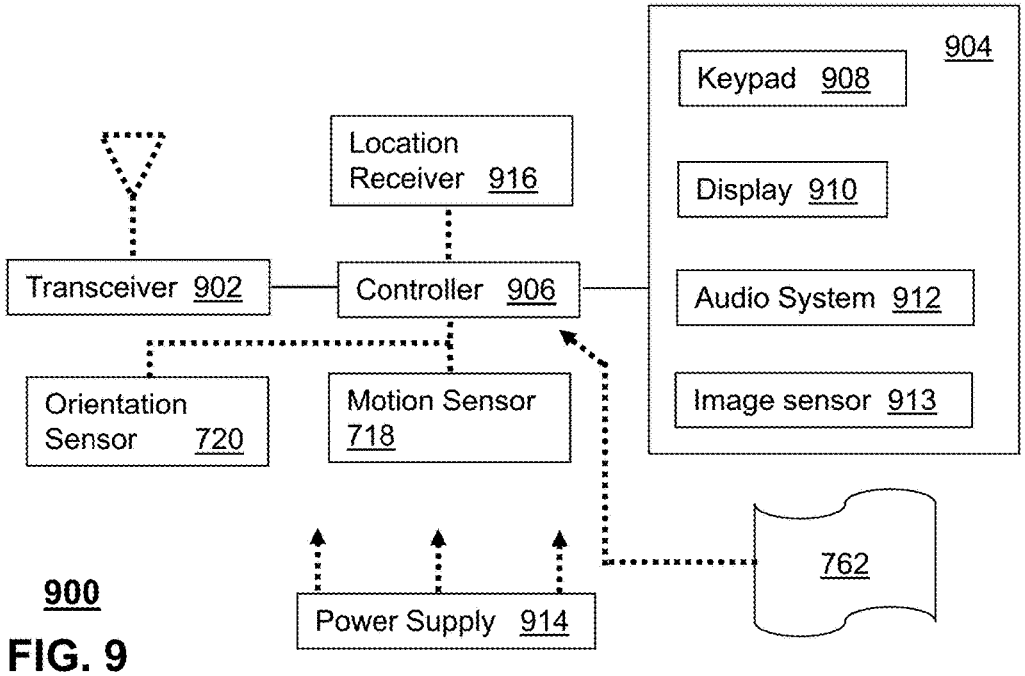
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1 and/or 3-4, and FIG. 7 and can be configured to perform portions of the process 400 of FIG. 4 and/or process 450 of FIG. 4B.

The communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of one or more of the UE 104, 106, the wireless access nodes 102 and the servers 116 of FIG. 1, the UE and/or the network devices of FIGS. 3-4, the media processor 706, the media devices 708, or the portable communication devices 716 of FIG. 7, as well as the IMS CDs and PSTN CDs of an IMS network. It will be appreciated that the communication device 900 can also represent other devices that can operate in systems 100, 500, 600 of FIGS. 1 and/or 5-6, communication system 700 of FIG. 7 such as a gaming console and a media player. In addition, the controller 906 can be adapted in various embodiments to perform the function 762.

Upon reviewing the aforementioned embodiments, it would be evident to an artisan with ordinary skill in the art that said embodiments can be modified, reduced, or enhanced without departing from the scope of the claims described below. For example, although sharing of control/signaling load information among wireless access nodes has been disclosed as occurring by way of the X2 interface, it is conceivable that other techniques to allow for sharing of this information are possible. For example, control/signaling load information can be shared over a direct wireless link between access nodes, over a direct wired or other communication link between access nodes, such as an operation and maintenance channel, through other portions of the network, such as by way of any of the gateways or modules of the evolved packet core network. It is also understood that information supporting a determination of a control/signaling load can be reported to another entity, such as a network accessible server, e.g., operated by the network or a third party service. In such instances, the control/signaling load information can be obtained directly, by reports from the wireless access nodes.

It is also understood that such control/signaling load information can be obtained independently, e.g., by another device, such as a network monitor or suitable device to monitor network traffic. The monitoring can occur in the transport network, in the radio network layer, e.g., over the air, or some combination of the same. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
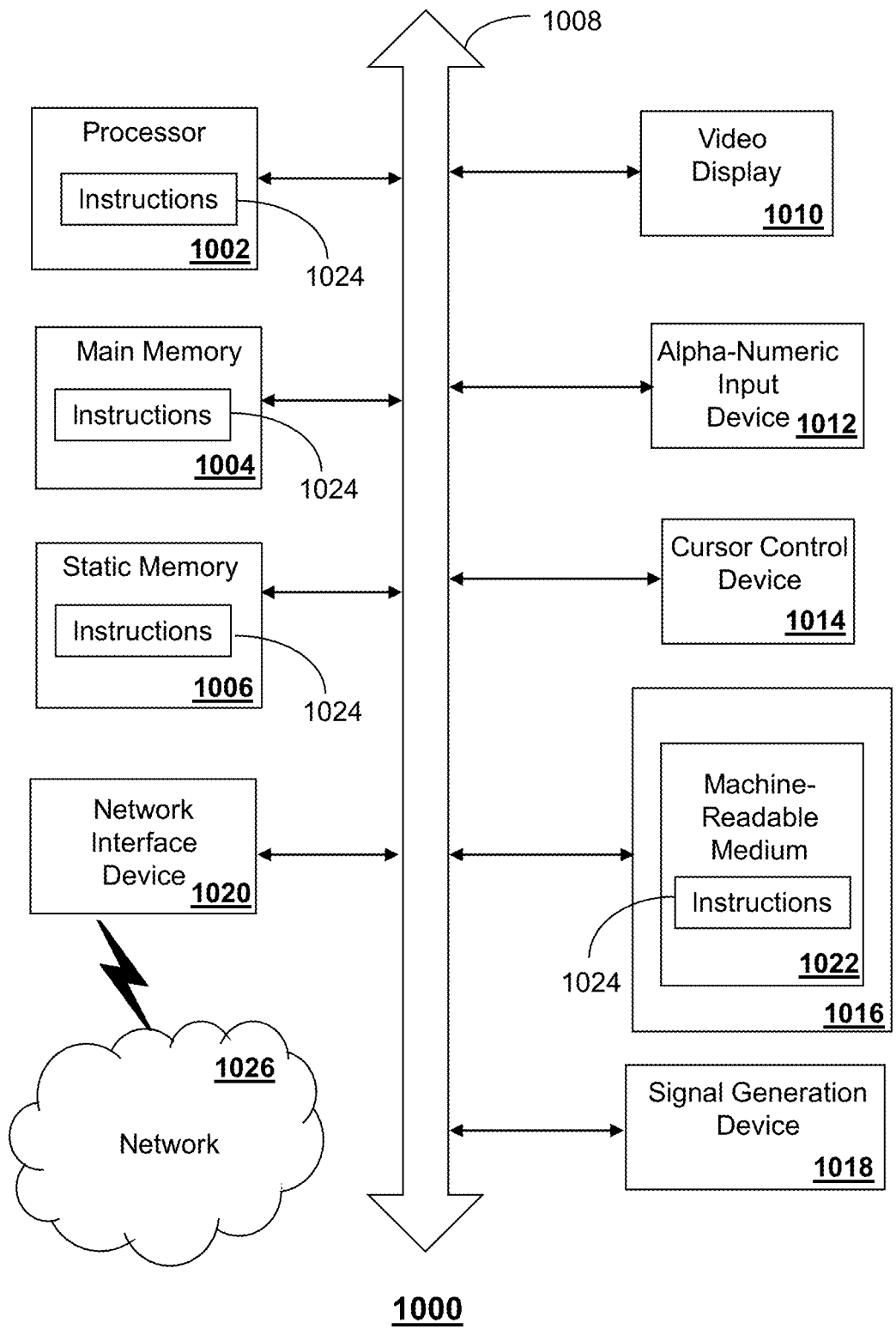
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the access node 102, 602, the mobile device 104, 106, 508, 608 components of the core network 504, the server(s) 116 and other devices of FIGS. 1, 3 and 5-7. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. For example, although reference is made to mobile devices, it is understood that the techniques disclosed herein also apply to any wireless device, including fixed or otherwise non-mobile devices, such as workstations, utility meters and so on. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining, by a first wireless access node comprising a processing system including a processor, a first indication of a first signaling load of the first wireless access node based on coordination of first network traffic of a first plurality of mobile devices in wireless communication with the first wireless access node;
    receiving, by the first wireless access node, from a second wireless access node, a second indication of a second signaling load of the second wireless access node based on coordination of second network traffic of a second plurality of mobile devices in wireless communication with the second wireless access node; and responsive to one of the first indication of the first signaling load, the second indication of the second signaling load, or both:
- determining, by the first wireless access node, data loading contributions of the first plurality of mobile devices;
- comparing, by the first wireless access node, the data loading contributions of the first plurality of mobile devices to a data threshold to determine whether a first data loading contribution associated with a first mobile device, of the first plurality of mobile devices, exceeds the data threshold;
- identifying, by the first wireless access node, the first mobile device for a first handover according to a first data loading contribution exceeding the data threshold; and
- initiating, by the first wireless access node, the first handover of the first mobile device from the first wireless access node to the second wireless access node.

2. The method of claim 1, wherein the handover of the first mobile device comprises moving network access by a first application executing at the first mobile device from the first wireless access node to the second wireless access node while maintaining network access via the first wireless access node by a second application executing at the first mobile device.

3. The method of claim 2, wherein the second indication of the second signaling load is received by way of an inter-node communication protocol,
wherein the identifying of the first mobile device comprises evaluating, by the first wireless access node, one of the first indication of the first signaling load, the second indication of the second signaling load, or both, and
wherein the identifying of the first mobile device is based on the evaluating of the signaling load.

4. The method of claim 2, further comprising determining, by the first wireless access node, an indication of a relative signaling load determined between the first indication of the first signaling load and the second indication of the second signaling load, wherein the initiating of the handover of the first mobile device is based on the relative signaling load.

5. The method of claim 4, wherein the identifying of the first mobile device comprises comparing, by the first wireless access node, one of the first indication of the first signaling load, the second indication of the second signaling load, the relative signaling load, or a combination thereof to a threshold value to determine a comparison result, wherein the initiating of the handover of the first mobile device is further based on the comparison result.

6. The method of claim 1, wherein the first wireless access node and the second wireless access node are Long Term Evolution network nodes, wherein the receiving of the second indication of the second signaling comprises receiving messages according to an inter-node communication protocol of the Long Term Evolution network, operative between the first wireless access node and the second wireless access node.

7. The method of claim 1, further comprising implementing a network reconfiguration according to a self-organizing network based on one of the first indication of the first signaling load, the second indication of the second signaling load, or both.

8. A device comprising:
a memory that stores executable instructions; and
a processing system including a processor coupled to the memory, wherein the processing system, responsive to executing the instructions, facilitates performance of operations comprising:
- determining, at a first wireless access node, a first indication of a first signaling load of a first wireless access node based on coordination of first network traffic of a first plurality of mobile devices in wireless communication with the first wireless access node;
- receiving, at the first wireless access node, from a second wireless access node, a second indication of a second signaling load of the second wireless access node based on coordination of second network traffic of a second plurality of mobile devices in wireless communication with the second wireless access node;
- determining data loading contributions of the first plurality of mobile devices;
- comparing the data loading contributions of the first plurality of mobile devices to a data threshold to determine whether a first data loading contribution associated with a first mobile device, of the first plurality of mobile devices, exceeds the data threshold;
- identifying the first mobile device for a first handover according to a first data loading contribution exceeding the data threshold; and
- initiating a handover of the first mobile device from the first wireless access node to the second wireless access node based on the identifying of the first mobile device.

9. The device of claim 8, wherein the handover of the first mobile device comprises moving network access by a first application executing at the first mobile device from the first wireless access node to the second wireless access node while maintaining network access via the first wireless access node by a second application executing at the first mobile device.

10. The device of claim 9, wherein the receiving of the second indication of the second signaling comprises receiving messages according to an inter-node communication protocol operative between the first wireless access node and the second wireless access node, and
wherein the identifying of the first mobile device comprises:
- evaluating one of the first indication of the first signaling load, the second indication of the second signaling load or both to determine an evaluation; and
- identifying the first mobile device based on the evaluation.

11. The device of claim 10, wherein the determining of the first indication of the first signaling load comprises distinguishing an application of a plurality of applications that generates a relatively large number of small transactions from another application of the plurality of applications that generates a relatively small number of large transactions.

12. The device of claim 8, further comprising determining an indication of relative signaling load between the first indication of the first signaling load and the second indication of the second signaling load,
wherein the identifying of the first mobile device is based on the relative signaling load.

13. The device of claim 12, further comprising comparing one of the signaling load of the first wireless access node, the signaling load of the second wireless access node, the relative signaling load, or a combination thereof to a threshold value to determine a comparison result, wherein the initiating of the handover of the first mobile device is based on the comparison result.

14. The device of claim 8, wherein the first wireless access node and the second wireless access node are Long Term Evolution network nodes, wherein the receiving of the second indication of the second signaling comprises receiving messages according to an inter-node communication protocol of the Long Term Evolution network, operative between the first wireless access node and the second wireless access node.

15. A non-transitory machine-readable storage medium, comprising executable instructions that, responsive to being executed by a processing system including a processor, cause the processing system to facilitate performance of operations comprising:
   determining, at a first wireless access node, a first indication of a first signaling load of the first wireless access node based on coordination of first network traffic of a first plurality of mobile devices in wireless communication with the first wireless access node;
   receiving, at the first wireless access node, a second indication from a neighboring wireless access node of a second signaling load at the neighboring wireless access node based on coordination of second network traffic of a second plurality of mobile devices in wireless communication with the neighboring wireless access node;
   determining data loading contributions of the first plurality of mobile devices;
   comparing the data loading contributions of the first plurality of mobile devices to a data threshold to determine whether a first data loading contribution associated with a first mobile device, of the first plurality of mobile devices, exceeds the data threshold;
   identifying the first mobile device for a first handover according to the first data loading contribution of the first mobile device exceeding the data threshold; and
   initiating a handover of the first mobile device from the first wireless access node to the neighboring wireless access node based on the identifying of the first mobile device.

16. The non-transitory machine-readable storage medium of claim 15, wherein the handover of the first mobile device comprises moving network access by a first application executing at the first mobile device from the first wireless access node to the neighboring wireless access node while maintaining network access via the first wireless access node by a second application executing at the first mobile device.

17. The non-transitory machine-readable storage medium of claim 16, wherein the indication from the neighboring wireless access node is received by way of an inter-node communication protocol operative between the first wireless access node and the neighboring wireless access node, and
   wherein the identifying of the first mobile device further comprises:
      determining a third indication of a third signaling load based on coordination of first network traffic of the first plurality of mobile devices;
   evaluating one of the second indication of the second signaling load, the third indication of the third signaling load, or both to determine an evaluation; and
   identifying the first mobile device based on the evaluation.

18. The non-transitory machine-readable storage medium of claim 15, wherein the determining of the first indication of the first signaling load comprises distinguishing an application of a plurality of applications that generates a relatively large number of small transactions from another application of the plurality of applications that generates a relatively small number of large transactions.

19. The non-transitory machine-readable storage medium of claim 15, further comprising:
   determining a third indication of a third signaling load at the first wireless access node, wherein the third signaling load of the first wireless access node is based on coordination of the first network traffic of the first plurality of mobile devices; and
   determining a fourth indication of relative signaling load between the second indication of the signaling load and the third indication of the third signaling load, wherein the identifying of the first mobile device is further based on the relative signaling load.

20. The non-transitory machine-readable storage medium of claim 19, further comprising comparing one of the second signaling load, the third signaling load, or the relative signaling load to a threshold value to determine a comparison result, wherein the initiating of the handover of the first mobile device is further based on the comparison result.

* * * * *